United States Patent [19]

Ide

[11] Patent Number: 4,751,397
[45] Date of Patent: Jun. 14, 1988

[54] POWER SOURCE CIRCUIT FOR BASE DRIVE CIRCUITS FOR A TRANSISTOR INVERTER

[75] Inventor: Yuichi Ide, Fuji, Japan

[73] Assignee: Tokyo Shibaura Denki Kabushiki Kaisha, Kawasaki, Japan

[21] Appl. No.: 486,353

[22] Filed: Apr. 19, 1983

[30] Foreign Application Priority Data

Apr. 23, 1982 [JP] Japan .............................. 57-59191[U]

[51] Int. Cl.$^4$ ............................................... H02J 1/00
[52] U.S. Cl. ......................................... 307/31; 307/52
[58] Field of Search ....................... 307/17, 18, 31, 52, 307/69, 83; 363/27, 20, 21, 137, 132

[56] References Cited

U.S. PATENT DOCUMENTS

| | | | |
|---|---|---|---|
| 3,569,818 | 3/1971 | Dahlinger | 307/17 X |
| 4,302,803 | 11/1981 | Shelly | 363/20 |
| 4,310,866 | 1/1982 | Wirth | 363/132 |
| 4,370,701 | 1/1983 | Western | 363/20 |

FOREIGN PATENT DOCUMENTS

| | | |
|---|---|---|
| 55-14078 | 3/1980 | Japan . |
| 81/00575 | 12/1981 | PCT Int'l Appl. . |
| 1319288 | 6/1973 | United Kingdom . |
| 2030800 | 4/1980 | United Kingdom . |
| 2066012 | 7/1981 | United Kingdom . |

Primary Examiner—A. D. Pellinen
Assistant Examiner—Derek S. Jennings
Attorney, Agent, or Firm—Foley & Lardner, Schwartz, Jeffery, Schwaab, Mack, Blumenthal & Evans

[57] ABSTRACT

A power source circuit for base drive circuits in a transistor inverter comprises a high frequency transformer having a plurality of secondary windings respectively provided in association with the base drive circuits, a high frequency inverter connected to receive a DC power and supply a high frequency current to the primary of the high frequency transformer, and a plurality of converters respectively provided in association with the base drive circuits, and hence in association with the secondary windings, and connected to receive the outputs of the associated secondary windings and provide DC voltages for energizing the associated base drive circuits.

6 Claims, 3 Drawing Sheets

F I G. 3
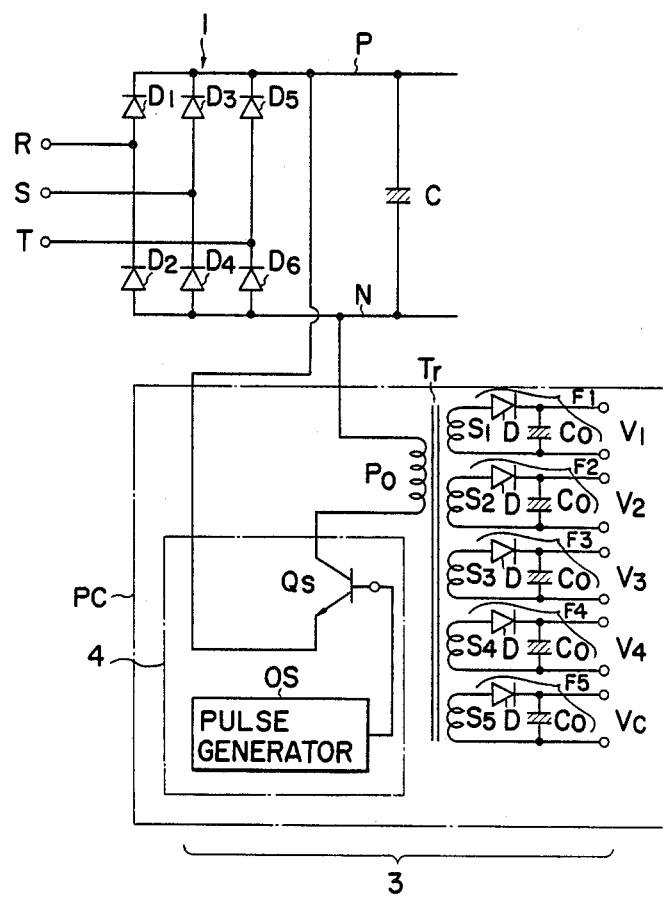

POWER SOURCE CIRCUIT FOR BASE DRIVE CIRCUITS FOR A TRANSISTOR INVERTER

BACKGROUND OF THE INVENTION

The present invention relates to a power source circuit for base drive circuits for a transistor inverter.

The main circuitry of a transistor inverter system comprises, as shown in FIG. 1, a converter 1 which is formed of diodes $D_1$-$D_6$ and converts a three-phase AC power from terminals R, S, T to a DC power. An inverter 2 whose arms are formed of power transistors $Q_1$-$Q_6$ receives the DC power from the converter 1 and converts it into a three-phase AC power of a variable frequency. The resultant AC power is fed to a load such as a motor. Inserted between the converter 1 and the inverter 2 are a smoothing capacitor C and a light emitting diode LED for indicating that the converter 1 is producing an output.

For control of the bases of the transistors $Q_1$-$Q_6$ of the inverter 2, four base drive circuits $BD_1$-$BD_4$, shown in FIG. 2, whose power source lines are independent of each other are needed: one $BD_4$ for the three transistors $Q_4$-$Q_6$ with the emitters connected to each other and three $BD_1$-$BD_3$ for the transistors $Q_1$, $Q_2$, $Q_3$, respectively.

A conventional power source circuit 3 comprises a transformer T having five secondary windings. Outputs from four of the secondary windings are respectively rectified by diode bridges DB and smoothed by smoothing capacitors Co to produce DC voltages $V_1$-$V_4$ used as the power source voltages for the respective base drive circuits. The remaining secondary winding is used to provide a power source voltage Vc for a conduction control circuit, not shown.

The above-described power source circuit 3 has the following problems. First, the transformer T is bulky and cannot be mounted on a printed circuit board, and therefore a considerable number of and lengthy leads are necessary to connect the transformer with the printed circuit board PC on which the base drive circuits and the conduction control circuit are formed. Moreover, each smoothing capacitor Co must be of a large capacitance. This results in a higher manufacturing cost, lower reliability and a larger overall size. For instance, for an inverter of 15 KVA having transistors $Q_1$-$Q_6$ with rated current of 15 A, the capacitance of each capacitor Co must be as large as 2000 $\mu$F, and four such capacitors are needed for the four base drive circuits $BD_1$-$BD_4$. This also results in higher cost and larger overall size.

SUMMARY OF THE INVENTION

An object of the invention is to provide a power source circuit for base drive circuits for a transistor inverter system which is compact, reliable and less expensive to manufacture.

According to the invention, there is provided a power source circuit for base drive units in a transistor inverter having arms formed of transistors, said base drive units controlling the bases of said transistors, said power source circuit comprising:

a high frequency transformer having a primary winding and a plurality of secondary windings respectively provided in association with the base drive circuits, a high frequency inverter connected to receive a DC power and supply a high frequency current to said primary winding of said high frequency transformer, and a plurality of converters respectively provided in association with the base drive circuits, and hence in association with the secondary windings, and connected to receive the outputs of the associated secondary windings and provide DC voltages for energizing the associated base drive circuits.

BRIEF DESCRIPTION OF THE DRAWINGS

In the drawings:

FIG. 3 is a circuit diagram showing an embodiment of a power source circuit according to the invention.

DETAILED DESCRIPTION OF THE PREFERRED EMBODIMENTS

FIG. 3 shows an embodiment of a power source circuit 3 according to the invention, which comprises a high frequency transformer Tr having a primary winding Po and secondary windings $S_1$-$S_5$. The secondary windings $S_1$-$S_5$ are provided in association with base drive circuits $BD_1$-$BD_4$ similar to those shown in FIG. 2, and a conduction control circuit CC.

A high frequency inverter 4 is connected to receive a DC power, e.g., across the DC terminals P, N of the inverter system, and supply a high frequency current to the primary winding Po. In the illustrated embodiment, the high frequency inverter 4 comprises a switching transistor Qs connected in series with the primary winding Po. The series connection of the primary winding Po and the switching transistor Qs is connected across the terminals P,N. A pulse generator OS, which may comprise an oscillator, produces a pulse signal at a high frequency of, e.g., 20–30 KHz. The pulse signal is applied to the base of the switching transistor Qs to repeatedly switch on and off the switching transistor Qs at the frequency of the pulse signal. This causes a high frequency pulsating current to flow through the primary winding Po. As a result, voltages of the same frequency are induced in the secondary windings $S_1$-$S_5$.

Converters $F_1$-$F_5$ are respectively provided in association with the base drive circuits $BD_1$-$BD_4$ and the conduction control circuit CC, and hence in association with the secondary windings $S_1$-$S_5$. The converters $F_1$-$F_5$ are connected to receive the outputs of the associated secondary windings $S_1$-$S_5$ and provide DC voltages $V_1$-$V_4$ and Vc for energizing the associated base drive circuits $BD_1$-$BD_4$ and the conduction control circuit CC.

In the illustrated embodiment, each of the converters $F_1$-$F_5$ comprises a rectifying diode D and a smoothing capacitor Co. With this arrangement, the outputs of the secondary windings $S_1$-$S_5$ are rectified and smoothed to become the DC voltages $V_1$-$V_4$ and Vc.

Figure 4:
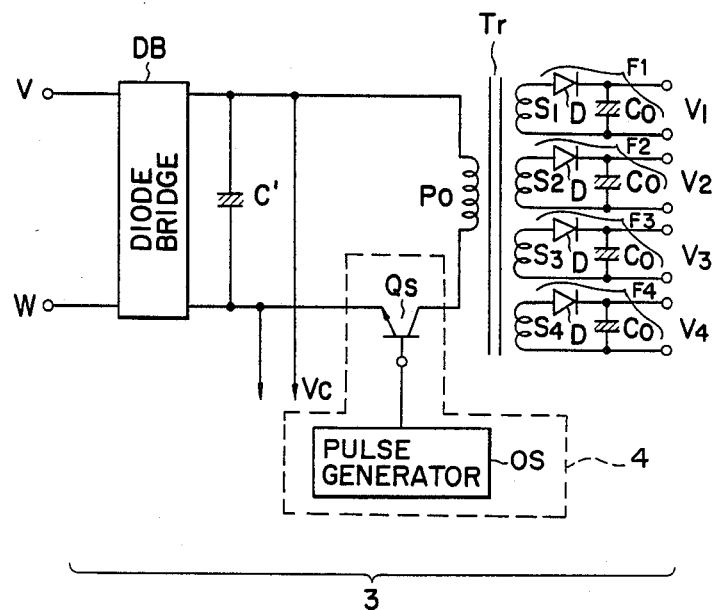
FIG. 4 is a circuit diagram showing another embodiment of the invention.

FIG. 4 shows another embodiment of the invention which is provided with a rectifier such as a diode bridge DBo, which receives an AC power at terminals V and W. The rectified output is smoothed by a smoothing capacitor C'. The high frequency inverter 4 is connected to receive the DC power across the capacitor C'. Four secondary windings $S_1$-$S_4$ are provided and connected to power, via converters $F_1$–$F_4$, the base drive circuits. A voltage Vc for the conduction control circuit is derived from across the capacitor C'.

Figure 1:
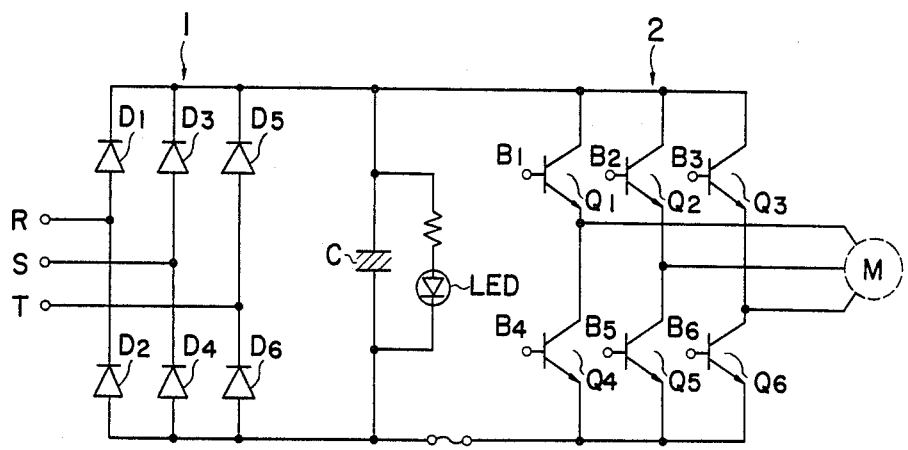
FIG. 1 is a circuit diagram showing a main circuitry of a transistor inverter system.
Figure 2:
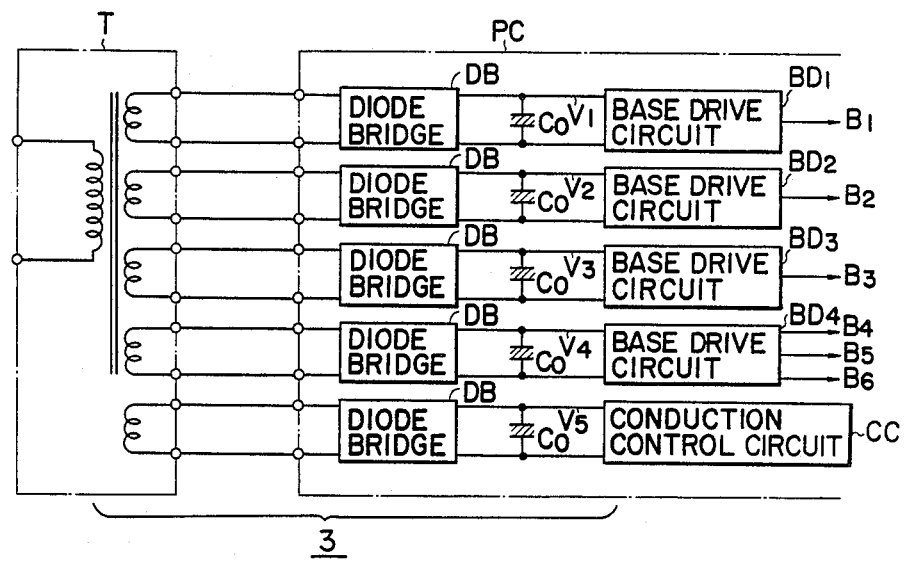
FIG. 2 is a circuit diagram showing a conventional power source circuit and base drive circuits.

With the use of a high frequency the size of the transformer can be much smaller, (e.g., one third) than with the conventional circuit of FIG. 2, to provide the same power to the base drive circuit. The transformer of such a small size can be mounted on the printed circuit board PC on which the base drive circuits and the conduction control circuit are also mounted. As a result, wiring is much simplified. Moreover, it should be noted that only one high frequency inverter is required for all of the base drive circuits and the conduction control circuit. This is an advantage uniquely attained where a high frequency inverter and a high frequency transformer are used for energizing a plurality of loads or circuits whose voltage lines are independent of each other. Furthermore, the smoothing capacitors Co can be of capacitances much smaller (e.g., of the order of one tenth) than those in the conventional circuit of FIG. 2. For these reasons, the power source circuit according to the invention is compact, reliable, and less costly to manufacture.

In addition, if a feedback circuit is incorporated in the high frequency inverter, the voltages can be stabilized.

What is claimed is:

1. A power source circuit for base driven circuits in a transistor inverter having arms formed of transistors, said base drive circuits controlling the bases of said transistors, said transistor inverter having DC terminals connected to receive DC power supplied from a rectifier circuit rectifying an AC input from an AC power circuit, said power source circuit comprising:
   a high frequency transformer having a primary winding and a plurality of secondary windings respectively provided in association with the base drive circuits;
   a high frequency inverter connected to receive DC power and supply a high frequency current to said primary winding of said high frequency transformer; and
   a plurality of converters respectively provided in association with the base drive circuits, and hence in association with the secondary windings, and connected to receive the outputs of the associated secondary windings and provide DC voltages for energizing the associated base drive circuits, 2. A power source circuit as set forth in claim 1 wherein said high frequency inverter comprises:
   a switching transistor connected in series with said primary winding, the series connection being connected to receive said DC power, and
   means for repeatedly switching on and off said switching transistor at a high frequency to cause a high frequency current to flow through said primary winding.

3. A power source circuit for base drive circuits, in a transistor inverter having arms formed of transistors, said base drive circuits controlling the bases of said transistors, said transistor inverter having DC terminals connected to receive DC power supplied from a rectifier circuit rectifying an AC input from an AC power circuit, said power source circuit comprising:
   a high frequency transformer having a primary winding and a plurality of secondary windings respectively provided in association with the base drive circuits;
   a high frequency inverter connected to receive DC power and supply a high frequency current to said primary winding of said high frequency transformer; and
   a plurality of converters respectively provided in association with the base drive circuits, and hence in association with the secondary windings, and connected to receive the outputs of the associated secondary windings and provide DC voltages for energizing the associated base drive circuits,
   said high frequency inverter being connected to receive the same DC power as connected across the DC terminals of said transistor inverter.

4. An inverter system comprising:
   a rectifier circuit connected to rectify AC power from an AC power source to produce DC power;
   a transistor inverter having arms formed of transistors and converting the DC power from the rectifier circuit into AC power; and
   base drive circuits for controlling the bases of said transistors and comprising:
   a high frequency transformer having a primary winding and a plurality of secondary windings respectively provided in association with the base drive circuits;
   a high frequency inverter connected to receive said DC power and supply a high frequency current to said primary winding of said high frequency transformer, said high frequency inverter being connected to receive the same DC power as connected across said DC terminals of said transistor inverter; and
   a plurality of converters respectively provided in association with the base drive circuits, and hence in association with the secondary windings, and connected to receive the outputs of the associated secondary windings and provide DC voltage for energizing the associated base drive circuits.

5. A system as set forth in claim 4 wherein said high frequency inverter comprises:
   a switching transistor connected in series with said primary winding, the series connection being connected to receive said DC power, and
   means for repeatedly switching on and off said switching transistor at a high frequency to cause a high frequency current to flow through said primary winding.

6. A power source circuit as set forth in claim 3 wherein said high frequency inverter comprises:
   a switching transistor connected in series with said primary winding, the series connection being connected to receive said DC power, and
   means for repeatedly switching on and off said switching transistor at a high frequency to cause a high frequency current to flow through said primary winding.

* * * * *